United States Patent
Mayer

(10) Patent No.: US 10,872,030 B2
(45) Date of Patent: Dec. 22, 2020

(54) CONTROL SYSTEM AND METHOD OF TO PERFORM AN OPERATION

(71) Applicant: Infineon Technologies AG, Neubiberg (DE)

(72) Inventor: Albrecht Mayer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 181 days.

(21) Appl. No.: 16/037,299

(22) Filed: Jul. 17, 2018

(65) Prior Publication Data
US 2019/0026213 A1 Jan. 24, 2019

(30) Foreign Application Priority Data
Jul. 19, 2017 (DE) .......................... 10 2017 116 304

(51) Int. Cl.
*G06F 11/36* (2006.01)
*G06F 9/30* (2018.01)
*G06F 9/38* (2018.01)

(52) U.S. Cl.
CPC .......... *G06F 11/364* (2013.01); *G06F 9/3013* (2013.01); *G06F 9/30076* (2013.01); *G06F 9/30079* (2013.01); *G06F 9/3822* (2013.01); *G06F 9/3869* (2013.01)

(58) Field of Classification Search
CPC .............. G06F 11/364; G06F 9/30076; G06F 9/30079; G06F 9/3013; G06F 9/3822; G06F 9/3869; G06F 11/348
See application file for complete search history.

(56) References Cited

U.S. PATENT DOCUMENTS

| 5,093,908 A * | 3/1992 | Beacom ................ G06F 9/3877 712/200 |
| 5,764,885 A | 6/1998 | Sites |
| 6,438,715 B1 * | 8/2002 | Assouad ............ G06F 11/3485 360/15 |
| 6,453,407 B1 * | 9/2002 | Lavi ..................... G06F 9/30145 712/24 |

(Continued)

OTHER PUBLICATIONS

Nexus (Standard), Website, Wikipedia (https://en.wikipedia.org/w/index.php?title=Nexus_(standard)&oldid=711604048), Mar. 23, 2016.

(Continued)

*Primary Examiner* — Farley Abad
(74) *Attorney, Agent, or Firm* — Eschweiler & Potashnik, LLC

(57) ABSTRACT

A method includes invoking a first instruction that, when executed by a first processor, causes the first processor to perform a first operation, and that, when executed by the first processor, causes a second processor to perform a second operation. The method further includes a second instruction that, when executed by the first processor, causes the first processor to perform the first operation while causing the second processor to perform a third operation or while leaving the second processor unaffected. A control system includes a first processor and a second processor, wherein the first processor is configured to execute a first instruction to perform a first operation, wherein the second processor is configured to perform a second operation when the first processor executes the first instruction.

20 Claims, 2 Drawing Sheets

(56) References Cited

U.S. PATENT DOCUMENTS

| | | |
|---|---|---|
| 7,149,926 B2 | 12/2006 | Ahmad |
| 8,819,699 B2* | 8/2014 | Cota-Robles ....... G06F 9/45558 |
| | | 719/313 |
| 2002/0129309 A1* | 9/2002 | Floyd ................... G06F 11/261 |
| | | 714/724 |
| 2007/0011492 A1* | 1/2007 | Swaine ............... G06F 11/3636 |
| | | 714/35 |

OTHER PUBLICATIONS

Wang, Chien-Min, "Architecture and Programming for Embedded Processors-Lecture 3-ARM", Slideshow, URL: http://www.iis.sinica.edu.tw/~cmwang/arm/ ; 2008.

Hyde, Randal, "The Art of Assembly Language", Chapter Five, URL: http://www.plantation-products.com/Webster/www.artofasm.com/Windows/index.html ; 2003.

\* cited by examiner

CONTROL SYSTEM AND METHOD OF TO PERFORM AN OPERATION

REFERENCE TO RELATED APPLICATION

This application claims priority to DE 10 2017 116 304.2 filed on Jul. 19, 2017, the contents of which are incorporated by reference in their entirety.

FIELD

Various embodiments relate generally to a control system and a method of causing an operation.

SUMMARY

The following presents a simplified summary in order to provide a basic understanding of one or more aspects of the disclosure. This summary is not an extensive overview of the disclosure, and is neither intended to identify key or critical elements of the disclosure, nor to delineate the scope thereof. Rather, the primary purpose of the summary is to present some concepts of the disclosure in a simplified form as a prelude to the more detailed description that is presented later.

In one aspect, a method comprises providing a first instruction that, when executed by a first processor, causes the first processor to perform a first operation, and that, when executed by the first processor, causes a second processor to perform a second operation. Further, the method comprises providing a second instruction that, when executed by the first processor, causes the first processor to perform the first operation while causing the second processor to perform a third operation or while leaving the second processor unaffected.

In one aspect, a control system comprises a first processor and a second processor. The first processor is configured to execute a first instruction to perform a first operation. The second processor is configured to perform a second operation when the first processor executes the first instruction. The first processor is configured to execute a second instruction to perform the first operation while causing the second processor to perform a third operation or while leaving the second processor unaffected.

In another aspect, a method comprises invoking a first instruction that, when executed by a first processor, causes the first processor to perform a first operation and that, when executed by the first processor, causes a second processor to perform a second operation. Further, the method comprises invoking a second instruction that, when executed by the first processor, causes the first processor to perform the first operation while causing the second processor to perform a third operation or while leaving the second processor unaffected.

This summary is submitted with the understanding that it will not be used to interpret or limit the scope or meaning of the claims. This summary is not intended to identify key features or essential features of the claimed subject matter, nor is it intended to be used as an aid in determining the scope of the claimed subject matter. Other methods, apparatus and systems are also disclosed. Those skilled in the art will recognise additional features and advantages upon reading the following detailed description, and upon viewing the accompanying drawings.

BRIEF DESCRIPTION OF THE DRAWINGS

The claimed subject matter is described below with reference to the drawings. As used herein, like terms refer to like elements throughout the description. The detailed description references the accompanying figures. The same numbers can be used throughout the drawings to reference like features and components. It should be noted that views of exemplary embodiments are merely to illustrate selected features of the embodiment.

DETAILED DESCRIPTION

Figure 1:
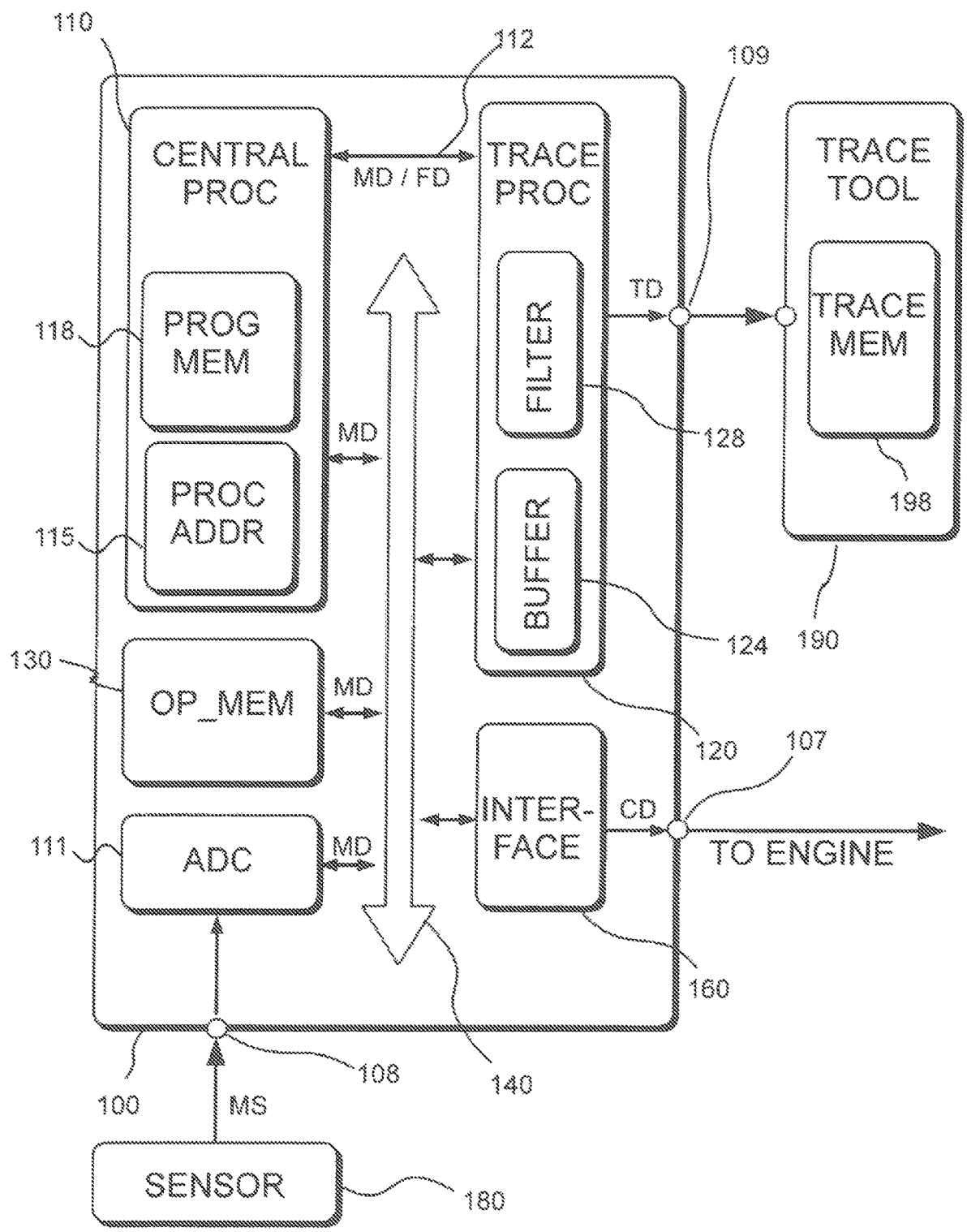
FIG. 1 shows a block diagram that illustrates an apparatus according to some embodiments.

For purposes of explanation, numerous specific details are set forth in order to provide a thorough understanding of the claimed subject matter. It may be evident, however, that the claimed subject matter may be practiced without these specific details.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, logical, and electrical changes may be made without departing from the scope of the disclosure. The various embodiments are not necessarily mutually exclusive, as some embodiments can be combined with one or more other embodiments to form new embodiments. Various embodiments are described in connection with methods and various embodiments are described in connection with devices. However, it should be understood that embodiments described in connection with methods may similarly apply to the devices, and vice versa.

A measuring apparatus detects a control unit variable of a control unit program which is executed in a control apparatus by a control unit processor. The control apparatus can be an engine controller for a motor vehicle, an embedded system or the like, which can be used to control actuators, for example electric motors, controllers or the like. The control unit processor uses a memory data connection with a detection device for detecting data which are transmitted on the memory data connection. The detecting device, for example, is a temperature sensor, a measuring transducer or the like that is connected to the control apparatus. The control unit processor executes a control program, for example in order to monitor the actuator, to control injection quantities of an internal combustion engine or the like.

The control unit processor is connected to a control unit memory of the control unit in order to store, for example, control parameters and other used, measured and/or calculated variables there. Thus, the control unit processor writes the control unit variable to a control unit memory. The control unit variable, for example, is a measured value, a temporary controller value, an output value at an actuator or the like. The variable may also comprise a program variable used by a program function.

The measuring apparatus has a buffer memory, to which, in a process herein also referred to as recording or tracing, the measuring apparatus writes the data which have been transmitted in memory access operations, i.e., when using the memory data connection, for transmission to a mapping memory, herein also referred to as a mirror memory. The mirror memory is thus made to hold a memory map of at least part of the control unit memory.

Recording the memory access operations of the control unit processor can be accomplished in multiple ways. In the case of microprocessors without internal peripherals and memories, it is conventional practice to record the external address/data bus and some control signals. The prerequisite for this so-called bus trace method is physical access to the memory interface of the control apparatus. Adapters which tap off the signals either directly from the control unit processor or directly from the memory module are typically used here. The signals may also be tapped off on the path between the control unit processor and the memory using Press-On adapters for conductor track pads or connectors. If a physical connection is possible in this manner, all memory access operations can be recorded and the program flow and all data access operations can be determined therefrom.

There are restrictions if the control unit processor is provided with a cache or internal RAM. In this case, the situation may occur in which no bus cycle appears on the external bus interface for a long period of time because all data required are already present in the internal memory and are executed there. In this case, a trace tool cannot record anything and the program behaviour remains hidden.

However, in many integrated processors ever higher integration densities and pricing pressure have resulted in processor core, cache, peripherals, flash and RAM memories being integrated in a single housing (system-on-chip). These processors often no longer even have an external memory interface. The bus trace method cannot be used in this case. Therefore, some processor architectures provide a special trace interface on the chip in addition to the debug interface. This trace interface can be used to make the program flow and data trace visible to the outside in compressed form.

A trace bus which has a width of 4, 8 or 16 bits and can be used to transmit program flow data and/or data access operations at a bus frequency of up to 400 MHz in compressed form is usually used as the trace interface. Other options are high-speed serial interfaces in the gigabit/s range with differential low-voltage swing signalling. In this case, the information on the address bus/data bus is transmitted in the manner in which it directly occurs in the CPU core with address and data values. This means that operations to access peripherals, chip-internal flash or RAM memory—in particular also cached operations—can also be recorded.

However, one disadvantage of this trace method is the high bandwidth needed to transmit the trace data. The problem is intensified in multi-core systems since the required bandwidth increases with the number of processors.

FIG. 1 shows a block diagram that illustrates a measurement system including an apparatus according to some embodiments. The measurement system comprises a control system 100 that is, for example, configured to control an engine (not shown). In an implementation, merely as one example of an operative task performed by the control system 100, the control system is configured to execute a computer implemented instruction code in order to control a fuel injection pump (not shown). The control system 100 comprises a first processor, herein referred to as central processor 110 configured to derive data from a measurement signal, and a second processor, herein referred to as trace processor 120, that is configured to provide interface functionality for the control system 100 to communicate with other components of the measurement system as will be explained in more detail below.

Further, the control system 100 comprises a memory, herein referred to as operations memory 130. The central processor 110 and the trace processor 120 can be communicatively coupled by an inter-processor bus 112. Further, the central processor 110 and the memory can communicatively be coupled by a system bus 140. In some embodiments, the central processor 110 and the operations memory 130 are provided as separate components of the control system 100, for example, on separate circuit boards that are communicatively coupled by the system bus 140. The inter-processor bus 112 and/or the system bus 140 can implement coaxial line, wireline, optical fibre, wireless and other transmission media. In some embodiments, the control system 100 is provided as a control unit or module with separate chips on one printed circuit board. In some embodiments, the control system 100 is provided as a system-on-chip with the central processor 110 and the trace processor 120 being co-located in one integrated circuit. Still, the trace processor 120 can be remote from the central processor 110. As used herein, the wording "remote" encompasses a co-location in a single integrated circuit, albeit, in different areas of an integrated circuit chip. The control system 100 comprises an input port 108 that is configured to receive values of a measurement signal MS, a control port 107 configured to output control signals, for example to an engine (not shown), and a trace port 109 that is configured to transmit trace data TD, for example, to a data recording device.

An embodiment of the measurement system comprises a sensor unit 180 that is configured to detect values associated with a physical property such as pressure, temperature or acceleration. In the course of time, the detected values can vary continuously to form an analog measurement signal MS. In an alternate embodiment (not shown), the sensor unit 180 comprises an analog-to-digital converter that is configured to form a digital measurement signal. The sensor unit 180 can be configured to transmit the values of the measurement signal MS via a coupling to the input port 108 of the control system 100.

In some embodiments, the measurement system comprises a trace tool 190. The trace tool 190 can be configured to record and/or analyze behaviour of the control system. In particular, the trace tool 190, in some embodiments, comprises a trace memory 198. The trace memory 198 is configured to receive, via a coupling to the trace port 109 of the control system 100, trace data TD and store the trace data TD. At least one effect can be that the trace memory 198 can be used as recording device for the trace data TD. In some embodiments, the control system 100 can be configured to co-operate with the trace tool 190 under the condition that the trace tool 190 is validated for co-operation. For example, the trace tool 190 can comprise a certificate and the control system is configured to receive the certificate from the trace tool 190 and verify a validity of the certificate. If the certificate is found valid, then the control system 100 co-operates with the trace memory 198 as, for example, described below.

Having regard to the control system 100, in an embodiment, the central processor 110 comprises an analog-to-digital converter ADC 111 that is configured to convert values of the analog measurement signal MS received at the input port 108 to digital representations of the values. A sequence of digital representations generated in time on the basis of the values of the analog measurement signal MS thus forms digital measurement signal data (MD), i.e., a digital representation of the analog measurement signal MS.

In some embodiments, the central processor 110 comprises a program memory 118 configured to store an instruction of a program to be executed by the central processor 110. In some embodiments, operations memory 130 can be configured to store the program while the central processor 110 is configured to load, in particular during runtime, instructions of the program to be executed from the operations memory 130 into the program memory 118. In particular, the instructions of the program are selected from a predetermined instruction set. The central processor 110 is configured such that instructions of the instruction set, when executed by the central processor 110, each cause the central processor 110 to perform a second operation that is associated with the particular instruction invoked by the central processor 110.

As will be explained in more detail below, in accordance with a concept underlying the present disclosure, a same operation can be associated with multiple different instructions of the predetermined instruction set. At least one effect can be that a first instruction and a second instruction can be associated with a same first operation to be performed while further causing another effect that, for the second instruction, differs from the further effect caused by execution of the first instruction. For example, generally, a second processor can be configured to perform a second operation when the first processor executes the first instruction, while the second processor is configured to perform a third operation, or be left unaffected to perform no operation, when the first processor executes the second instruction.

Accordingly, in some embodiments, a first instruction is provided that, when executed by the central processor 110 as a first processor, causes the central processor 110 to perform a first operation. For example, the central processor 110 is configured to perform a store operation, i.e., to write, using system bus 140, the digital measurement signal data MD into the operations memory 130. Other first operations can also be contemplated such as a memory read access to load data from memory, arithmetic operations, logic operations, and the like. Further, the first instruction, when executed by the central processor 110 causes the trace processor 120 as a second processor to perform a second operation.

For example, as a first instruction a STORE_FULL_TRACE instruction can be defined that, when executed on the central processor 110, causes the central processor 110 to write the digital measurement signal data into the operations memory 130. In addition, when the central processor 110 executes the STORE_FULL_TRACE instruction, the STORE_FULL_TRACE instruction causes the trace processor 120 to perform a trace operation that writes trace data TD to the trace port 109, whereby the operation performed by the central processor 110 is fully traced.

In some implementations, in the case of fully tracing, the trace operation executed by the trace processor 120 includes writing of full address, digital measurement signal data MD, set of attributes, such as supervisor mode access or user mode access, and the like, to the trace port 109. Thus, when the central processor 110 executes the STORE_FULL_TRACE instruction, the STORE_FULL_TRACE instruction causes the trace processor 120 to execute the trace operation on all trace data TD and write all trace data TD to the trace port 109. In some implementations, data written to the trace port 109 are then be transmitted to the trace tool 190.

Generally, further, a second instruction is provided that, when executed by the central processor 110, causes the central processor 110 to perform the first operation while leaving the trace processor 120 unaffected. Accordingly, in one example, as a second instruction a STORE_NO_TRACE instruction is defined that, when executed on the central processor 110, causes the central processor 110 to write the digital measurement signal MD data into the operations memory 130. However, in contrast to the first instruction STORE_FULL_TRACE, when the central processor 110 executes the STORE_NO_TRACE instruction, the STORE_NO_TRACE instruction does not have any effect on the trace processor 120. In some implementations, execution of the STORE_NO_TRACE instruction by the central processor 110 is ignored by the trace processor 120. Thus, in an example, the central processor 110 can be programmed to selectively execute one of the STORE_FULL_TRACE instruction and the STORE_NO_TRACE instruction wherein the central processor 110, for example, stores a measurement value to the operations memory 130.

In some implementations, the method generally further comprises invoking the first instruction including a reference to a referenced processor address register. Further, the method can comprise, if the referenced processor address register is associated with the second operation, performing the second operation. Still further, in some implementations, the method comprises invoking the second instruction including the reference to the referenced processor address register. At least one effect can be that a user, while having the first processor perform the first operation, can selectively also have the second processor perform the second operation. For example, in some embodiments, the first operation comprises operating on process data. In some embodiments, the second operation comprises writing selected data to the trace port of the second processor. In particular, as described above, the selected data can be based on the process data. In the example, depending on whether the STORE_FULL_TRACE instruction is invoked or the STORE_NO_TRACE instruction, the trace processor 120 selectively further executes the trace operation wherein the trace processor 120, for example, filters the digital measurement signal data MD and writes filtered data FD that are thus based on the digital measurement signal data MD to the trace port 109.

In some implementations, an instruction set for use with the central processor 110 can comprise at least two of a group of instructions that, when executed cause the central processor 110 to read or load a value from memory, for example from the operations memory 130, consisting of a READ_NO_TRACE instruction, a READ_SELECT_TRACE instruction and a READ_FULL_TRACE instruction. If the READ_NO_TRACE instruction is invoked, the trace processor 120 does not operate on the data read by the central processor 110. If the READ_ALL_TRACE instruction is executed, then the trace processor 120 is provided, for example via the inter-processor bus 112, with all measurement data MD and writes these data to the trace port 109. If the READ_SELECT_TRACE instruction is executed, then the trace processor is provided with a selected subset of filtered trace data FD, and writes these filtered data to the trace port 109.

Generally, another second instruction can be provided that, when executed by the central processor 110 as the first processor, causes the central processor 110 to perform the first operation. Further, the another second instruction, when executed by the central processor 110 causes the trace processor 120 to perform another third operation.

In some embodiments, the third operation is a no-operation. For example, when executed by the central processor 110, the STORE_NO_TRACE instruction causes the central processor 110 to perform the first operation while causing the trace processor 120 to execute an operation that is associated with a NOP instruction.

In some embodiments, a STORE_SELECT_TRACE instruction can be defined as the another second instruction. When executed by the central processor 110, the STORE_SELECT_TRACE instruction causes the central processor 110 to write the digital measurement signal data MD to the operations memory 130. However, in contrast to the first instruction STORE_FULL_TRACE, when the central processor 110 executes the STORE_SELECT_TRACE instruction, the STORE_SELECT_TRACE instruction does not necessarily cause the trace processor 120 to fully trace the operation performed by the central processor 110. Instead, the STORE_SELECT_TRACE instruction causes the trace processor 120 to selectively trace the operation performed by the central processor 110. In some embodiments, a user may be able to configure a selection, including a selection that includes all of a full trace operation. In some embodiments, a selection of a full trace operation is disabled. In some embodiments, a manufacturer can configure a selection while the user cannot. In some embodiments, the user can configure the selection while the manufacturer cannot.

In some embodiments, selectively tracing the operation performed by the central processor 110 includes some or all of writing a full address, measurement data, set of attributes such as supervisor mode access or user mode access, for example, to the trace port 109, whence the data, in some embodiments, are transmitted to the trace tool 190. At least one effect can be that bandwidth used for transmission of data from the trace processor 120 to the trace tool 190 can be reduced when compared with a full tracing. For example, in a full test mode, the STORE_FULL_TRACE instruction can be used to write all data that can be made subject to tracing to the trace port 109. In contrast, in a non-test operation mode, the STORE_SELECT_TRACE instruction can be used to filter, for example, a predetermined data type from all data so as to write only selected data to the trace port 109 that a user holds essential in order to monitor the operation of the central processor 110.

In some implementations, a first binary code representing the first instruction and a second binary code representing the second instruction have an equal length. Accordingly, having regard to the example described above, in some embodiments, binary representations of the STORE_NO_TRACE instruction, the STORE_SELECT_TRACE instruction, and the STORE_FULL_TRACE instruction all can have a same length such as 32 bit. At least one effect can be that in order to conduct a full test, the compiled code can be manipulated such that, for example, the STORE_SELECT_TRACE instruction is replaced by the STORE_FULL_TRACE instruction. In another example, the STORE_SELECT_TRACE instruction is replaced by the STORE_NO_TRACE instruction so as to use code whose execution does not cause the trace processor 120 to perform any tracing.

Again having regard to the control system 100, in some implementations, the central processor 110 comprises a processor address memory 115 that is configured to store an operations memory address. A processor address register of the processor address memory 115 can be associated with the second operation. In one example, the processor address register 115 is associated with the trace operation, while other processor address registers (not shown) are not associated with any operation. As explained above, the trace operation, in some embodiments, causes the control system 100 to write selected data or all data as trace data TD to the trace port 109. In some embodiments, the second operation comprises providing the selected data to the trace tool 190 that is coupled to the control system 100.

In some embodiments, the first operation involves an access to the processor address register 115 of the first processor 110. For example, the first operation can comprise storing a value such as a measurement value represented in the operations memory 130 by digital measurement signal data MD at an address that is stored in the central processor address register 115.

Generally, the first instruction can cause the second processor to perform the second operation, in some embodiments, only if the first operation involves the access to the associated processor address register of the first processor. Accordingly, in the example described herein, in some implementations, execution of the STORE_SELECT_TRACE instruction by the central processor 110 causes the trace processor 120 to perform the second operation, only if execution of the STORE_SELECT_TRACE instruction causes the central processor 110 to access the central processor address register 115 that is associated with tracing. For example, in some implementations, the second operation comprises writing digital measurement signal data MD that are subject to processing by the central processor 110 as trace data TD to the trace port 109. Similarly, in some implementations, execution of the STORE_FULL_TRACE instruction by the central processor 110 only causes the trace processor 120 to perform the second operation, such as writing digital measurement signal data MD that are subject to processing by the central processor 110 to the trace port 109, if execution of the STORE_FULL_TRACE instruction causes the central processor 110 to access the central processor address register 115 that is associated with tracing.

While in the illustrated example, the association of the processor address register 115 with the second operation is static, in some embodiments the association can be configurable, for example, by settings made prior to execution of software and/or by reconfiguring the settings during software execution. At least one effect can be that the software can control the conditions of the second operation to be performed.

Generally, in some embodiments, a content of the processor address register 115 can be interpreted as to whether to perform the second operation or not. The second operation is only performed, if a result of the interpreting the content indicates that the second operation should be performed. In some embodiments (not shown), interpreting the content of the processor address register 115 comprises comparing at least a portion of the content to a predetermined representation associated with the second operation. The result of the interpreting is determined to indicate that the second operation should be performed, if the portion of the content equals the predetermined representation. For example (not shown), one or more selected operations memory addresses can be selectively predetermined for tracing. Thus, in such embodiments, the second operation such as tracing will be performed only, if the processor address register 115 contains a predetermined selected operations memory address, Generally, in some embodiments, in the instruction invoked by the first processor, a control code can be included with the reference to the referenced processor address register. The control code is indicative of whether to perform the second operation or not. In some implementations, performing the second operation only takes place, if the control code indicates that the second operation should be performed. For example, in some implementations, the processor 110 uses the least significant bit of the base address in order to control that the instruction should be subject to tracing. In this example, when the first instruction is executed, where the processor address register 115 is associated with the exemplary trace operation, depending on the least significant bit of the base address, the trace operation is invoked or not. In one implementation, all base address registers of the first processor are associated with the second operation. In this case, the second operation is invoked only depending how the processor sets the control bit.

Generally, any bit in an argument of the first instruction can be used to indicate whether to perform the second operation or not. For example, in some implementations (not shown), the sign of the address offset is used to indicate whether to perform the second operation or not. Thus, the second operation is only performed, if the sign of the address offset indicates that the second operation should be performed. For example, in some implementations, the processor is adapted to interpret a most significant bit of a representation of the address offset as a sign of the address offset. The first processor is further configured to use the sign of the address offset in order to control that the first instruction should be subject to tracing. In this example, where the processor address register is associated with the exemplary trace operation, depending on the sign of the address offset being 1 or 0, the trace operation is invoked or not. In one implementation, all operation address registers 115 of the first processor are associated with the second operation. In this case, absent any other control bit to indicate whether to perform the second operation or not, the second operation is invoked only if the processor set the sign bit accordingly.

Generally, in some implementations, the first instruction causes the first processor to signal that the second operation be performed. For example, the central processor 110 can be configured to transmit, when the STORE_FULL_TRACE instruction is executed, a signal MD/FD to the trace processor 120 that causes the trace unit to execute the trace operation. In an alternative embodiment, the trace processor 120 monitors activity of the central processor unit 110. In some implementations, the trace processor 120 monitors data transmitted on the bus 140.

In some embodiments, the central processor 110 is configured to provide the information about a selected processor address register being associated with a second operation, herein also referred to as filter data (FD), to the trace processor 120 for use in processing the digital measurement signal data (TM).

Still referring to FIG. 1, the trace processor 120 will now be described in more detail. As will be seen, the trace processor 120 can be configured to determine, based on filter data (FD) received from the central processor 110, if an access to the operations memory address should be traced.

Further, in some embodiments, the trace processor 120 comprises a filter module 128 that is configured to filter the digital measurement signal data (MD) based on the filter data (FD) received from the central processor 110 so as to obtain selected data, herein also referred to as trace data (TD). In some embodiments, the filter data (FD) are merely a flag indicative of the second operation to be taken. In some embodiments, the trace processor 120 is configured to interpret the flag such that the digital value about to be written to the operations memory 130 should also be used as an operand in execution of the associated operation.

In some embodiments, the control system 100 is configured to override the filter module 128. At least one effect can be that the second operation is not performed even though the filter module 128 found that the second operation should be performed. For example, overriding can be used with an Interrupt-Service-Routine (ISR) operation. Interrupt services can be unrelated to a flow of processes in accordance with software instructions executed by the central processor 110. Accordingly, it may be undesirable to trace an access of an interrupt service to the processor address register 115 that is associated with the second operation. At least one effect of overriding, for example, can be that to avoid undesired tracing of interrupt service accesses to the processor address register despite processor address register's association with tracing as the second operation.

In some embodiments, the first processor comprises a counter configured to increment with a transmission of a process data to the second processor. The counter is configured to periodically decrement. The first processor is configured to stall, if the counter is above a configurable load threshold value. In some alternate embodiments, the counter is configured to periodically increment. The first processor is configured to stall, if the counter is below a configurable load threshold value. At least one effect can be that the transmission of the process data to the second processor is re-scheduled.

Still with reference to FIG. 1, further aspects of the central processor 110 in accordance with a general aspect outlined above will now be described in more detail.

In an embodiment, the second processor 120 comprises a buffer 124 that is configured as a FIFO buffer. In an implementation, a counter (not shown) coupled to or comprised in the first processor 110 is used to model a buffer fill level of the buffer in the second processor by incrementing when data are transmitted from the first processor 110 to the second processor 120. The counter can be made to decrement over time. The modelling of an operation of the trace processor 120 can include modelling or simulating filling of the data buffer 124 with the selected data and/or removing the selected data from the data buffer 124.

In some embodiments, the trace processor 120 can be provided as a state machine. In still another embodiment, the trace processor 120 is integrated with the central processor 110. Thus, the central processor 110 provides the functionality of the trace processor 120.

Figure 2:
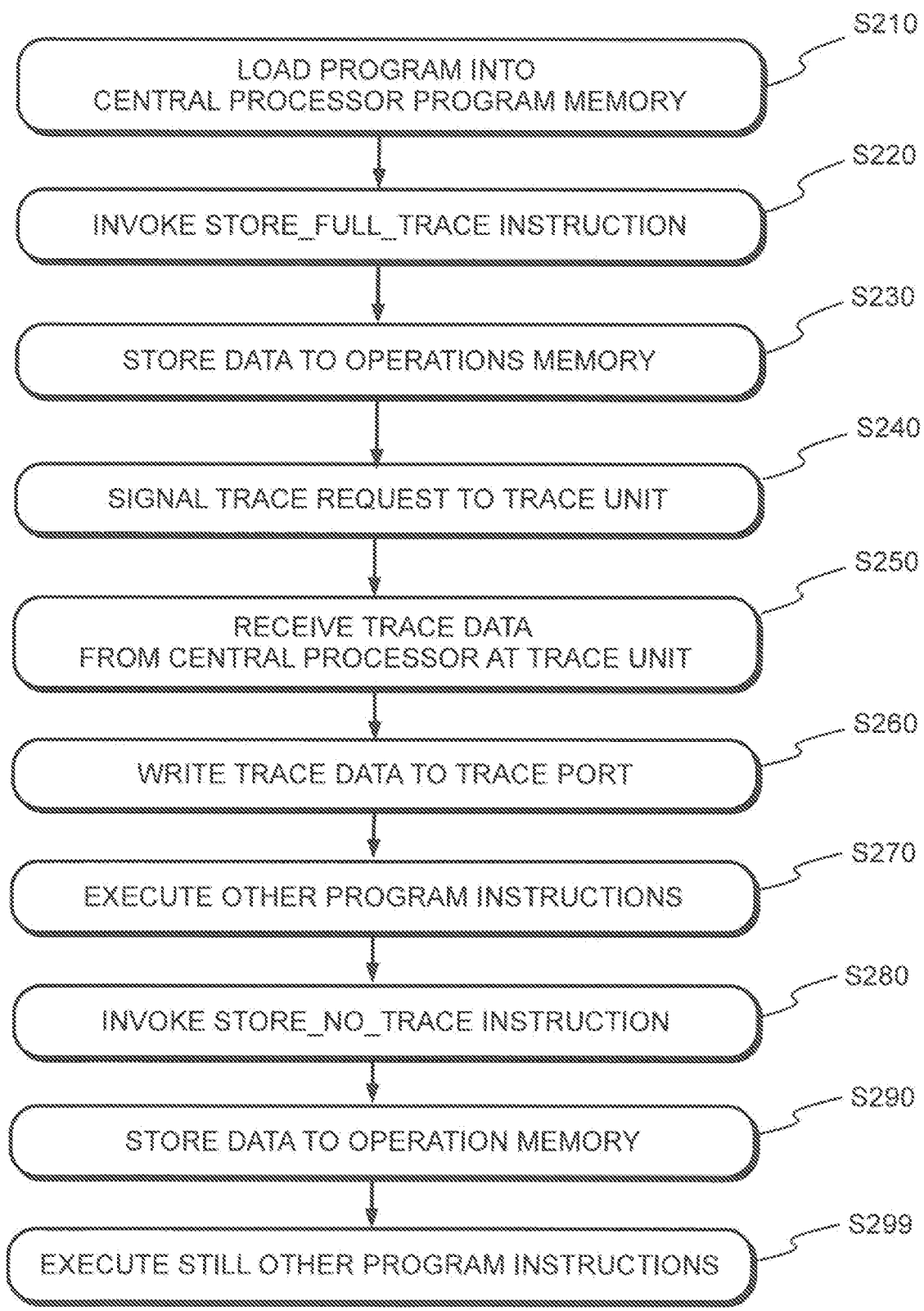
FIG. 2 shows a flow chart that illustrates an exemplary method according to some embodiments.

Below, an exemplary method of operating the control system 100 in accordance with a general aspect outlined above will be described with reference to FIG. 2 which shows a flow chart of the exemplary method according to some embodiments. Reference will also be made to FIG. 1.

At S210, one or more instructions of a computer program are loaded into the central processor program memory 118. The computer program comprises a sequence of instructions that when executed cause the central processor 110 to perform second operations. In some embodiments, the computer program comprises a STORE_FULL_TRACE instruction and STORE_NO_TRACE instruction as described above. In a variant, the computer program comprises a STORE_SELECT_TRACE instruction instead of, or in addition to, the STORE_FULL_TRACE instruction.

At S220, the computer program is executed and an instruction is invoked that accesses the operations memory 130. For example, the instruction can be a STORE_FULL_TRACE instruction that, when executed, causes the central processor 110 to write a value of the digital measurement signal data MD into the operations memory 130.

At S230, the central processor 110 executes the STORE_FULL_TRACE instruction. The central processor 110 writes, for example, the digital measurement signal data MD into the operations memory 130 that represents the value of the digital measurement signal. The central processor 110 can use the system bus 140 in order to transmit the data to the operations memory 130.

In some embodiments, the central processor 110 uses indirect addressing. Thus, rather than directly addressing the operations memory 130, the STORE_FULL_TRACE instruction uses the processor address register 115. In some embodiments, as described above, the processor address register 115 is associated with the second operation. In the presently described example, the second operation comprises the trace operation. Thus, also vice versa, the trace operation is associated with the processor address register 115.

At S240, in some embodiments that implement indirect addressing, the STORE_FULL_TRACE instruction causes the processor to read an operations memory address from the processor address register 115. Next, in some embodiments (not shown in FIG. 2), the processor determines, if the processor address register 115 is associated with a second operation. If no association is determined, then, the flow moves on to another processing step S270. In the example illustrated in FIG. 2, the processor address register 115 is always associated with the trace operation and, therefore, without checking for any association, the exemplary operation carries on to perform the second operation. For example, the STORE_FULL_TRACE instruction can cause the central processor 110 to signal to the trace processor 120 to perform the trace operation whereby the operation performed by the central processor 110 is fully traced.

At S260, the associated second operation is performed. In the illustrated example, the trace operation is performed. More particularly, in one example, in accordance with filter data FD, the filter module 128 selects trace data (TD) from the digital measurement signal data MD. The trace data TD are output at the trace port 109. In some embodiments, where the trace tool 190 is coupled to the trace port 109, the trace data TD can then be written to the trace memory 198 of trace tool 190. Accordingly, a set of trace data TD is thus stored in the trace memory 198 that are a copy or trace of the corresponding digital measurement signal data MD stored in the operations memory 130.

At S270, the central processor 110 executes one or more other instructions of the program.

At S280, the central processor 110 executes the STORE_NO_TRACE instruction. The STORE_NO_TRACE instruction causes the central processor 110 to write the digital measurement signal data into the operations memory 130. However, in contrast to the first instruction STORE_FULL_TRACE, when the central processor 110 executes the STORE_NO_TRACE instruction, the STORE_NO_TRACE instruction does not have any effect on the trace processor 120.

In some implementations, a first number of clock cycles that are required to execute the first instruction, in the example that is the STORE_FULL_TRACE instruction, and a second number of clock cycles required to execute the second instruction, that is in the example the STORE_NO_TRACE instruction, are equal. Accordingly, having regard to the example described above, in some embodiments, the central processor requires a same number clock cycles to execute the STORE_NO_TRACE instruction, the STORE_SELECT_TRACE instruction and the STORE_FULL_TRACE instruction.

At S299, the operation of the control system 100 continues with other processing.

In a further exemplary embodiment, a control system comprises an operations memory and a first processor coupled to the operations memory. The first processor is configured to derive digital measurement signal data from a measurement signal. The first processor is further configured to write the digital measurement signal data into the operations memory at an operations memory address. The control system further comprises a second processor that is coupled to the first processor and configured to process, for instance filter and compress the digital measurement signal data based on the operations memory address so as to obtain selected data.

In some embodiments (not shown), the control system comprises a plurality of first processors or central processors. The plurality of first processors can be coupled to a common bus and, via the common bus, to a common operations memory. The concepts and principles outlined above with respect to one central processor can, thus, also be implemented with more than one central processor.

In the above description of exemplary implementations, for purposes of explanation, specific numbers, materials configurations, and other details are set forth in order to better explain the disclosure, as claimed. However, it will be apparent to one skilled in the art that the claimed disclosure may be practiced using different details than the exemplary ones described herein.

Although some aspects have been described in the context of an apparatus, these aspects also represent a description of the corresponding method, where a block or device corresponds to a method step or a feature of a method step. Analogously, aspects described in the context of a method step also represent a description of a corresponding block or item or feature of a corresponding apparatus.

The disclosed arrangements may be implemented partially or fully in hardware using logic circuits or VLSI design.

The implementations herein are described in terms of exemplary embodiments. However, it should be appreciated that individual aspects of the implementations may be separately claimed and one or more of the features of the various embodiments may be combined. In some instances, well-known features are omitted or simplified to clarify the description of the exemplary implementations.

As used herein, the word 'exemplary' means serving as an example, instance, or illustration. Any aspect or design described herein as 'exemplary' is not necessarily to be construed as preferred or advantageous over other aspects or designs. Rather, use of the word exemplary is intended to present concepts and techniques in a concrete fashion.

As used herein, the term 'or' is intended to mean an inclusive 'or' rather than an exclusive 'or.' That is, unless specified otherwise or clear from context, 'X employs A or B' is intended to mean any of the natural inclusive permutations. That is, if X employs A; X employs B; or X employs both A and B, then 'X employs A or B' is satisfied under any of the foregoing instances.

As used herein, the articles 'a' and 'an' should generally be construed to mean 'one or more,' unless specified otherwise or clear from context to be directed to a singular form.

As used herein, the terms 'coupled' and 'connected' may have been used to describe how various elements interface. Unless expressly stated or at least implied otherwise, such described interfacing of various elements may be either direct or indirect.

As used herein, the terms 'having', 'containing', 'including', 'with' or variants thereof, and like terms are open ended terms intended to be inclusive. These terms indicate the presence of stated elements or features, but do not preclude additional elements or features.

As used herein, the word 'continuous' is to be understood in accordance with an implemented underlying mode of operation. For example, if a system is understood to operate in a clocked mode, the wording 'continuous operation' can mean an operation in the clocked mode while the wording does not address operation in another mode.

As used herein, the term 'module' can refer to any known or later developed hardware, software, firmware, or combination thereof that is capable of performing the functionality associated with that element.

As used herein, the terms 'determine', 'calculate' and 'compute', and variations thereof, are used interchangeably and include any type of methodology, process, mathematical operation or technique.

As used herein, terms such as 'first', 'second', and the like, are also used to describe various elements, regions, sections, etc. and are also not intended to be limiting.

The invention claimed is:

1. A method, comprising:
providing a first instruction that, when executed by a first processor, causes the first processor to perform a first operation, and that, when executed by the first processor, causes a second processor to perform a second operation; and
providing a second instruction that, when executed by the first processor, causes the first processor to perform the first operation while causing the second processor to perform a third operation or while leaving the second processor unaffected, wherein the third operation is a no-operation.

2. The method of claim 1,
wherein a first binary code representing the first instruction and a second binary code representing the second instruction have an equal length.

3. The method of claim 1,
wherein a first number of clock cycles that are required to execute the first instruction and a second number of clock cycles required to execute the second instruction are equal.

4. The method of claim 1, further comprising:
associating a processor address register of the first processor with the second operation;
wherein the first operation involves an access to the associated processor address register of the first processor; and
wherein the first instruction causes the second processor to perform the second operation only if the first operation involves the access to the associated processor address register of the first processor.

5. The method of claim 4, further comprising:
invoking the first instruction including a reference to a referenced processor address register;
if the referenced processor address register is the associated processor address register, performing the second operation; and
invoking the second instruction including the reference to the referenced processor address register.

6. The method of claim 1,
wherein the first instruction causes the first processor to signal that the second operation be performed.

7. The method of claim 1,
wherein the second processor is a trace unit.

8. The method of claim 1,
wherein the first operation comprises operating on process data; and
wherein the second operation comprises writing selected data to a trace port of the second processor, wherein the selected data are based on the process data.

9. The method of claim 8,
wherein the first instruction is one of a group consisting of a write instruction for writing the process data to a memory and a read instruction for reading the process data from the memory.

10. A control system, comprising:
a first processor and a second processor,
wherein the first processor is configured to execute a first instruction to perform a first operation, wherein the first instruction includes a reference to a referenced processor address register;
wherein the second processor is configured to perform a second operation when the first processor executes the first instruction if the referenced processor address register is associated with the second operation; and
wherein the first processor is configured to execute a second instruction to perform the first operation while causing the second processor to perform a third operation or while leaving the second processor unaffected, wherein the second instruction includes the reference to the referenced processor address register.

11. The control system of claim 10,
wherein the first processor is configured to require a same number of clock cycles in order to execute the first instruction and the second instruction.

12. The control system of claim 10, wherein the third operation is a no-operation.

13. The control system of claim 10,
wherein the first operation comprises operating on process data,
wherein the second operation comprises writing selected data to a trace port, and
wherein the selected data are based on the process data.

14. The control system of claim 13, further comprising:
a memory that is coupled to the first processor, wherein the first processor is configured to write the process data into the memory at a memory address or to read the process data from the memory at the memory address, and
wherein the second operation comprises generating a trace message to be written to the trace port.

15. The control system of claim 13,
wherein the second processor is configured to filter the process data based on the referenced processor address register so as to obtain the selected data to be written to the trace port.

16. The control system of claim 15,
wherein the first processor comprises a counter that is configured to increment with transmissions of process data from the first processor to the second processor and to decrement proportional to clock cycles.

17. The control system of claim 15,
wherein the first processor and the second processor are co-located in one integrated circuit.

18. The control system of claim 10,
wherein the second processor is provided as a state machine.

19. A method, comprising:
invoking a first instruction that, when executed by a first processor, causes the first processor to perform a first operation, wherein the first instruction includes a reference to a referenced processor address register, and wherein the first instruction, when executed by the first processor, causes a second processor to perform a second operation if the referenced processor address register is associated with the second operation; and invoking a second instruction that, when executed by the first processor, causes the first processor to perform the first operation while causing the second processor to perform a third operation or while leaving the second processor unaffected, wherein the second instruction includes the reference to the referenced processor address register.

20. The method of claim 19, wherein the third operation is a no-operation.

* * * * *